(12) United States Patent
Evans et al.

(10) Patent No.: US 9,796,355 B1
(45) Date of Patent: Oct. 24, 2017

(54) HOOD LIFTER ASSEMBLY WITH PROTECTIVE COVER

(71) Applicant: FORD GLOBAL TECHNOLOGIES, LLC, Dearborn, MI (US)

(72) Inventors: Nancy C Evans, Clinton Township, MI (US); Dean Robert Rife, Shelby Township, MI (US); David Lee Jarvis, Madison Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/250,225

(22) Filed: Aug. 29, 2016

(51) Int. Cl.
*B60R 21/38* (2011.01)
*B62D 25/12* (2006.01)

(52) U.S. Cl.
CPC .............. *B60R 21/38* (2013.01); *B62D 25/12* (2013.01)

(58) Field of Classification Search
CPC combination set(s) only.
See application file for complete search history.

(56) References Cited

U.S. PATENT DOCUMENTS

| 8,490,735 | B2* | 7/2013 | Farooq | B60R 21/38 180/274 |
| 2004/0112664 | A1* | 6/2004 | Fredriksson | B60R 21/38 180/274 |
| 2005/0257980 | A1* | 11/2005 | Green | B62D 25/12 180/274 |
| 2006/0131086 | A1* | 6/2006 | Lutter | B60R 21/34 180/69.21 |
| 2008/0156556 | A1* | 7/2008 | Takahashi | B62D 25/12 180/69.21 |
| 2009/0229901 | A1* | 9/2009 | Aoki | B62D 25/12 180/69.21 |
| 2009/0283347 | A1* | 11/2009 | Boggess | B60R 21/38 180/69.21 |
| 2011/0031056 | A1* | 2/2011 | Takahashi | B60R 21/38 180/274 |
| 2013/0192917 | A1* | 8/2013 | Matsuda | B60R 21/38 180/274 |
| 2015/0336535 | A1* | 11/2015 | Leavesley | B60R 21/34 296/187.09 |

FOREIGN PATENT DOCUMENTS

| CN | 203345057 U | 12/2013 | |
| EP | 2699455 B1 | 3/2016 | |
| FR | EP 1932729 A1 * | 6/2008 | ........... B62D 25/081 |
| FR | 2912710 A1 * | 8/2008 | ........... B62D 25/081 |

(Continued)

OTHER PUBLICATIONS

English Machine Translation of CN203345057U.
English Machine Translation of JP2004338444A.
English Machine Translation of JP5205835B2.

*Primary Examiner* — Nicole T Verley
(74) *Attorney, Agent, or Firm* — Jason Rogers; King & Schickli, PLLC

(57) ABSTRACT

A hood lifter assembly includes an actuator having a piston displaceable between a home position and a hood lifting position. The hood lifter assembly also includes a cover overlying the piston in the home position and protecting the actuator from water exposure. A cowl vent grille and a method of lifting a vehicle hood in response to a pedestrian impact event are also disclosed.

19 Claims, 14 Drawing Sheets

(56) References Cited

FOREIGN PATENT DOCUMENTS

| | | | | |
|---|---|---|---|---|
| FR | 2989638 A1 | * | 10/2013 | ............ B60S 1/0405 |
| JP | 2004338444 A | | 12/2004 | |
| JP | 2007106368 A | * | 4/2007 | |
| JP | 6205835 B2 | | 3/2013 | |
| JP | DE 102013012472 A1 | * | 2/2014 | ........... B60N 2/4885 |
| JP | DE 102009018402 B4 | * | 12/2014 | ............. B60R 21/38 |
| WO | 2014096943 A1 | | 6/2014 | |

\* cited by examiner

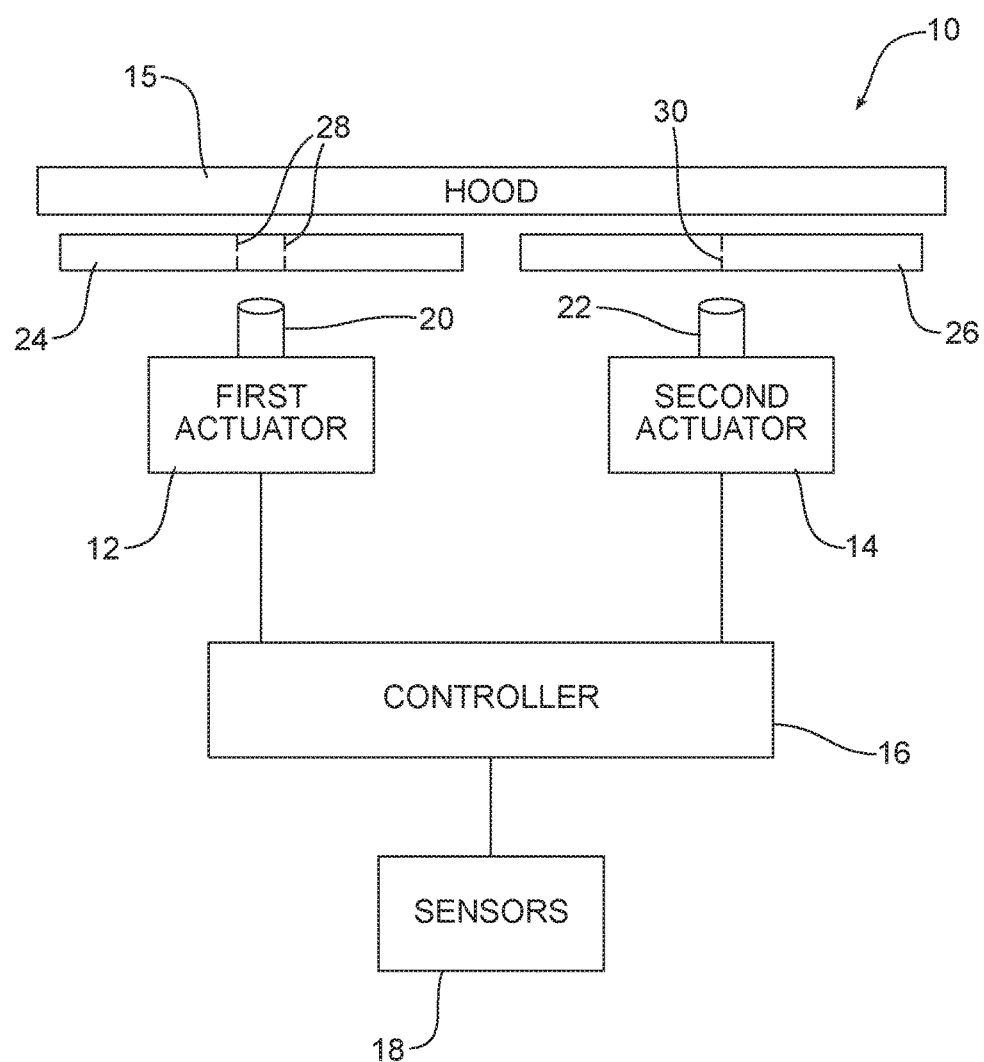

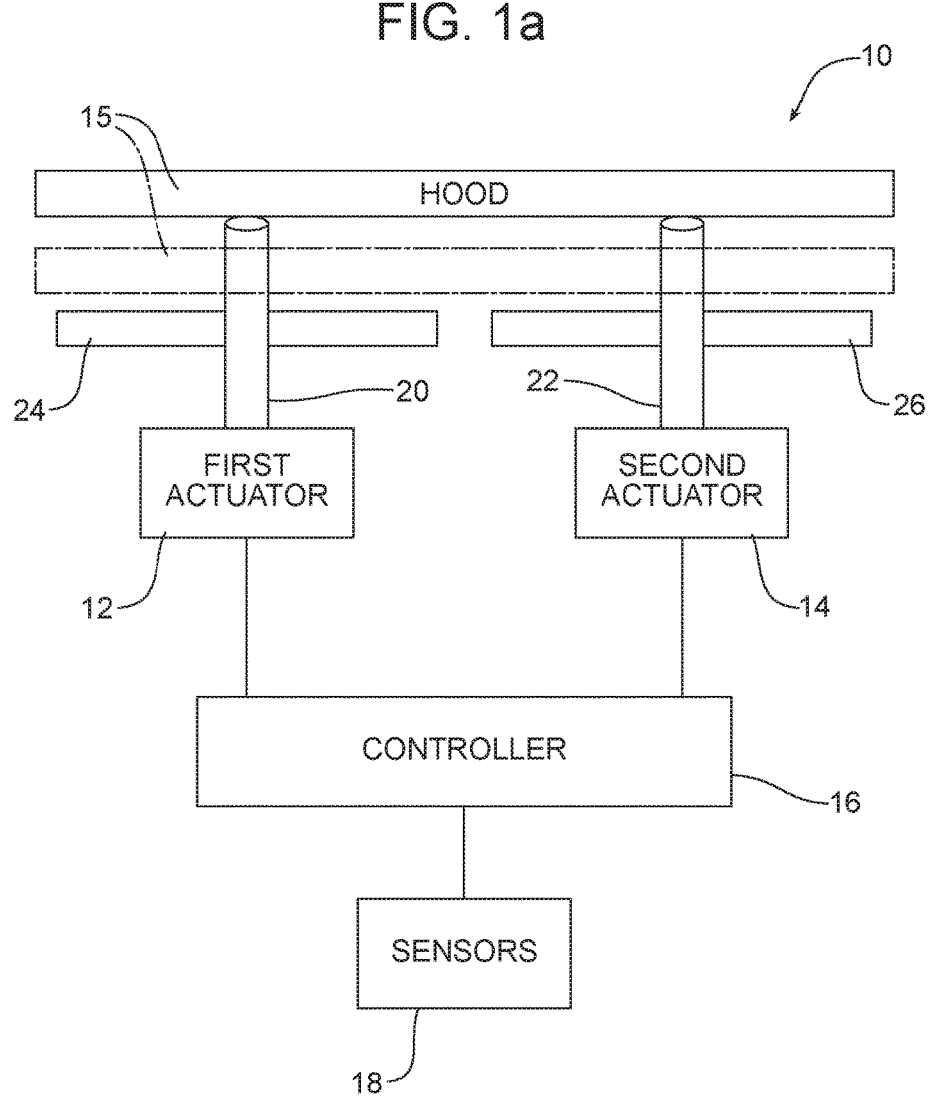

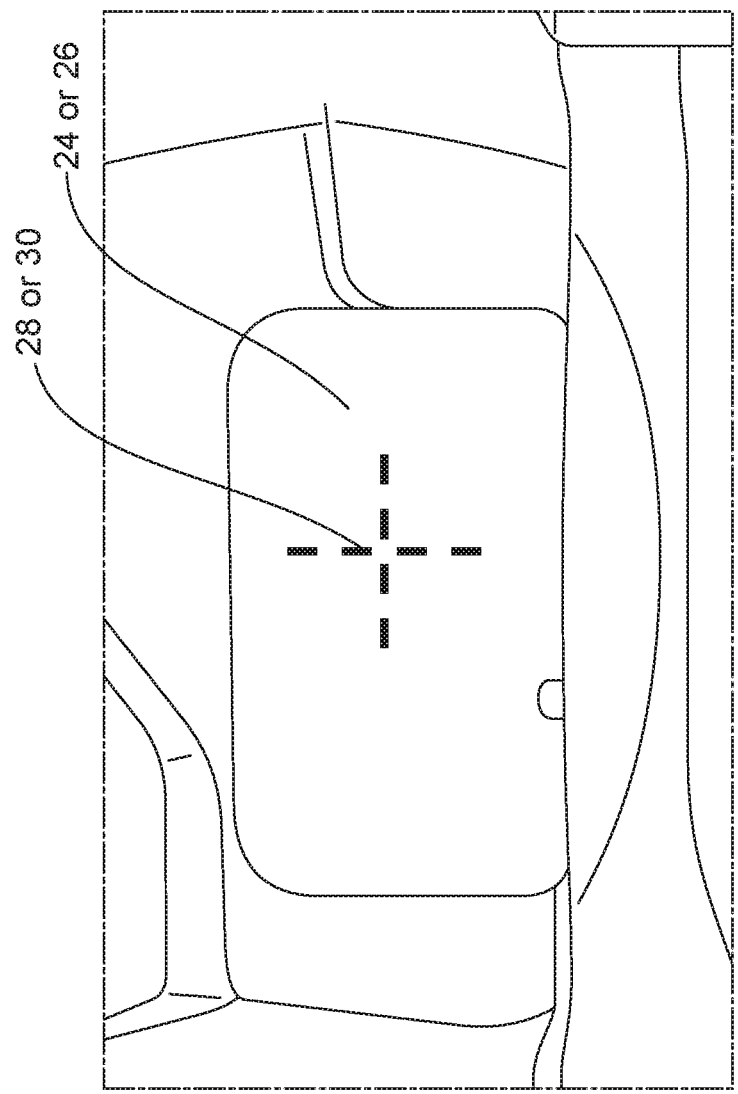

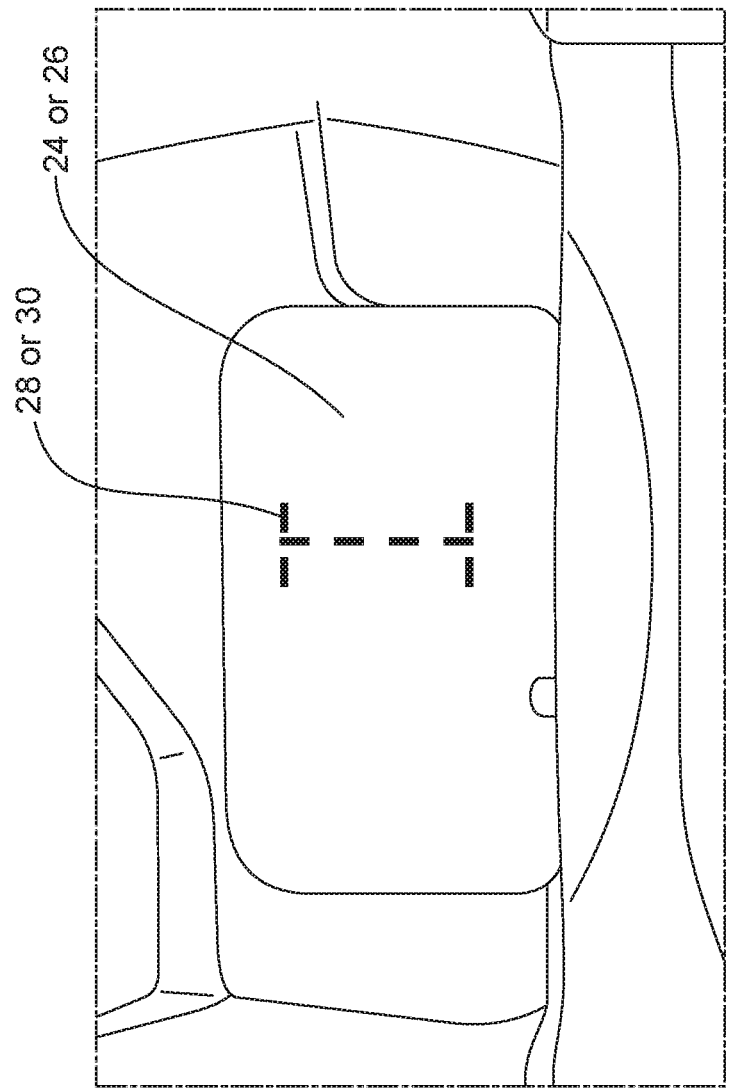

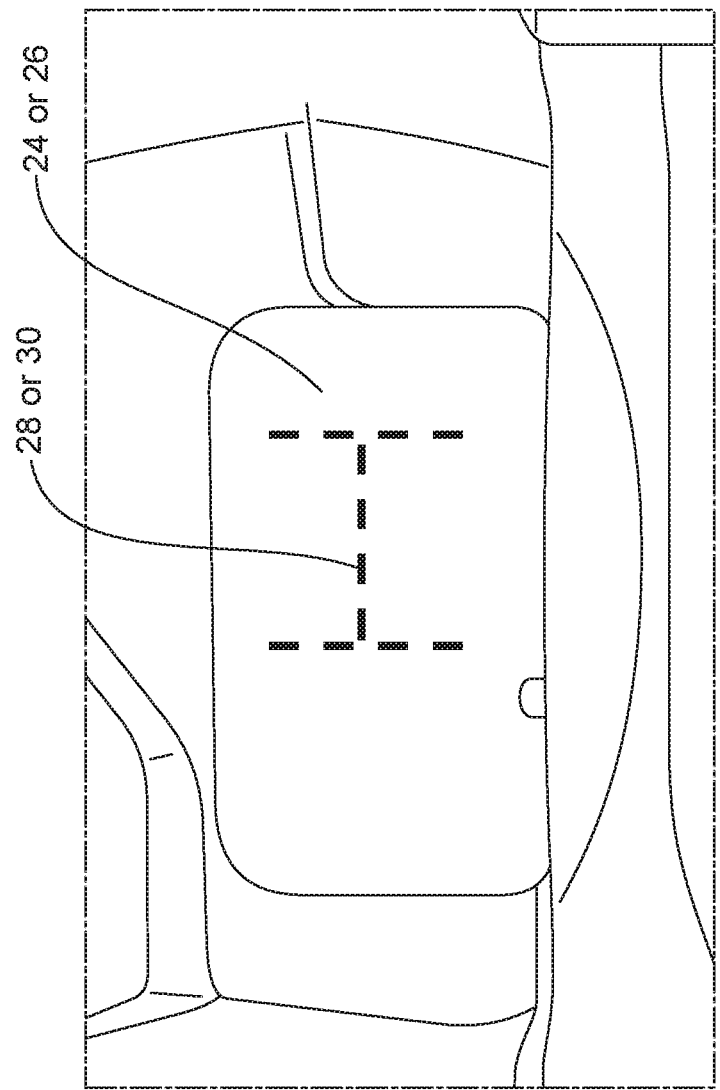

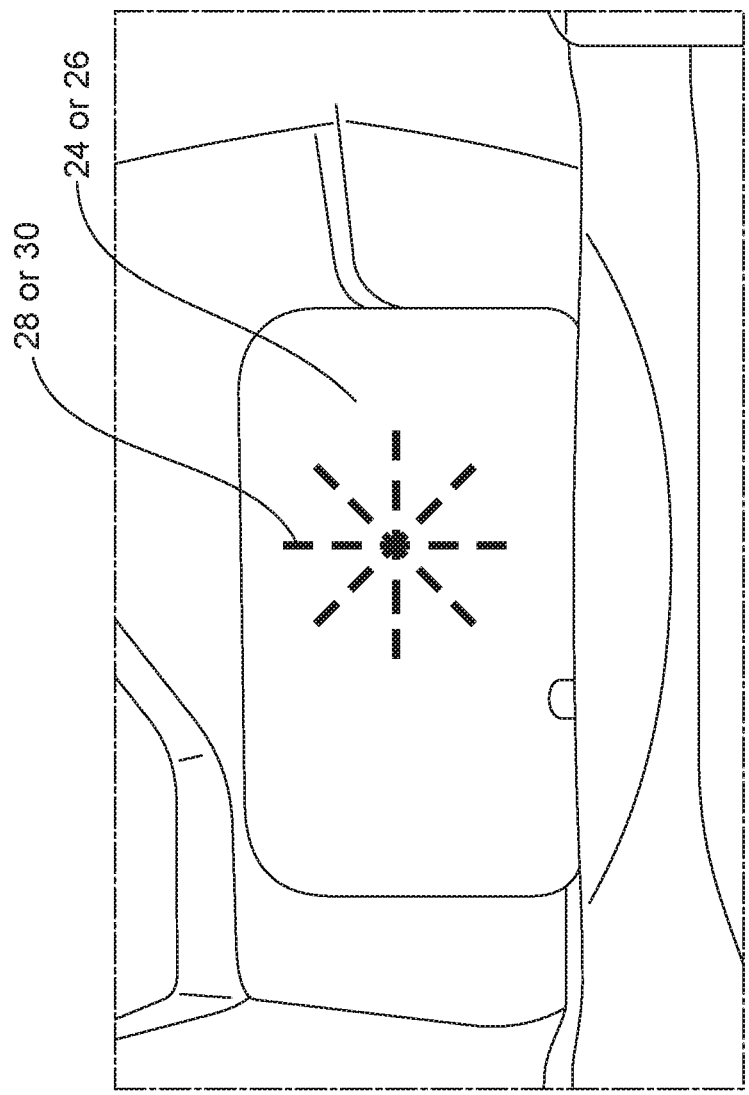

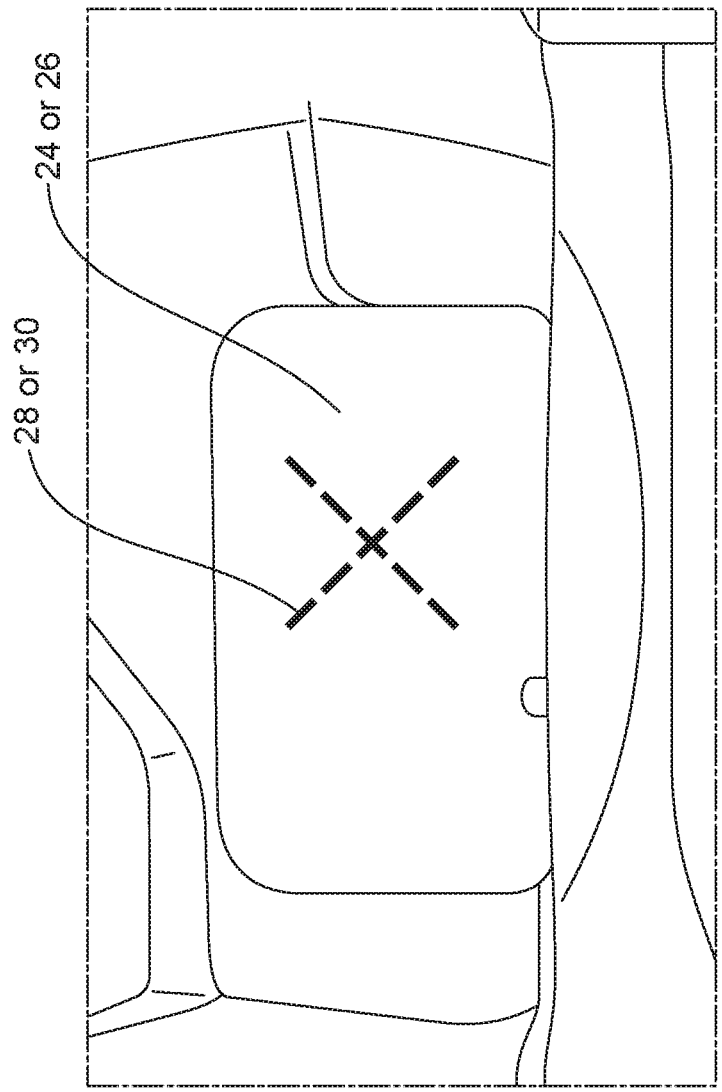

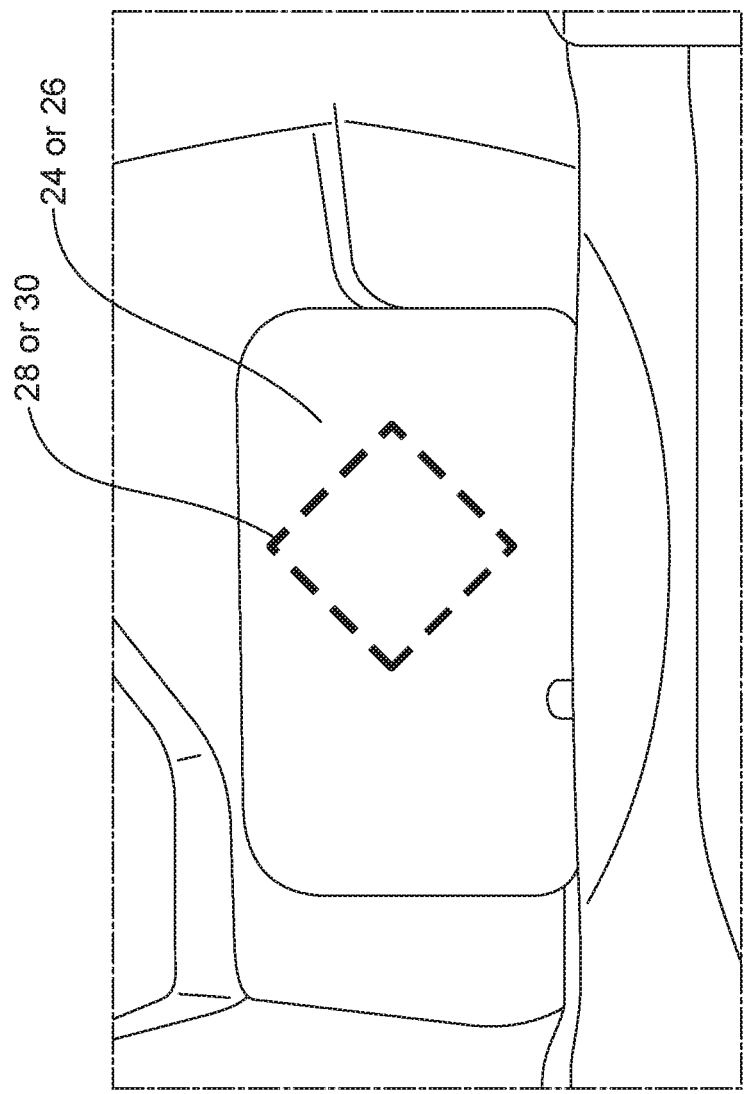

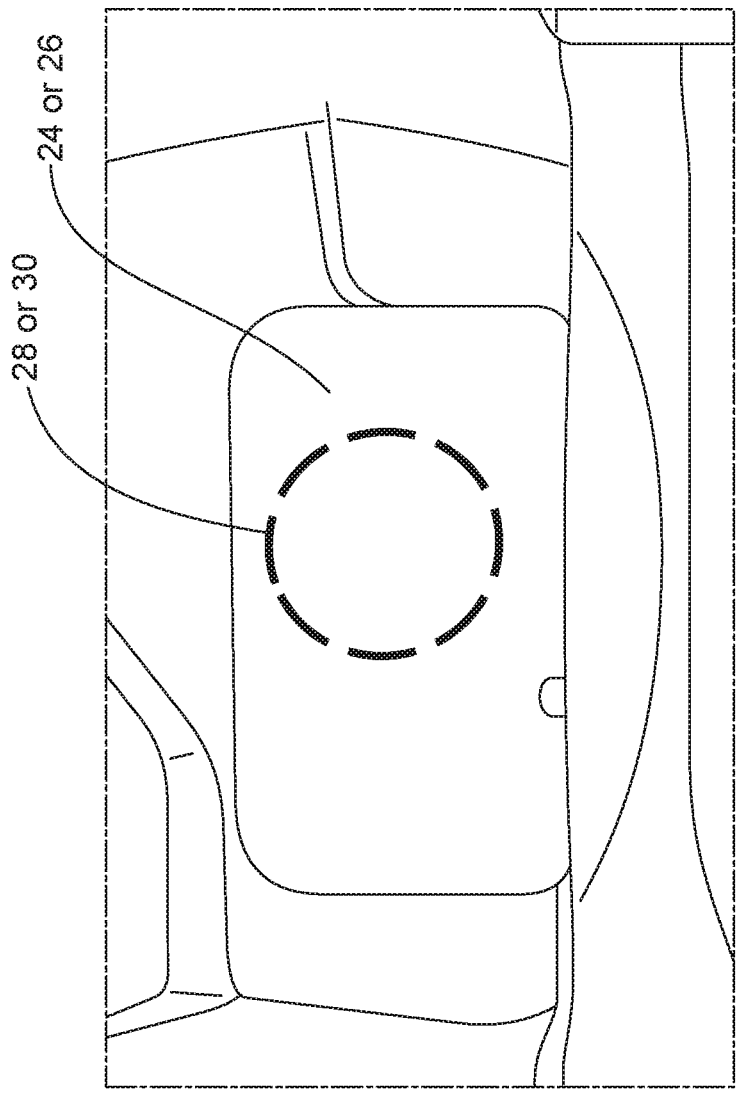

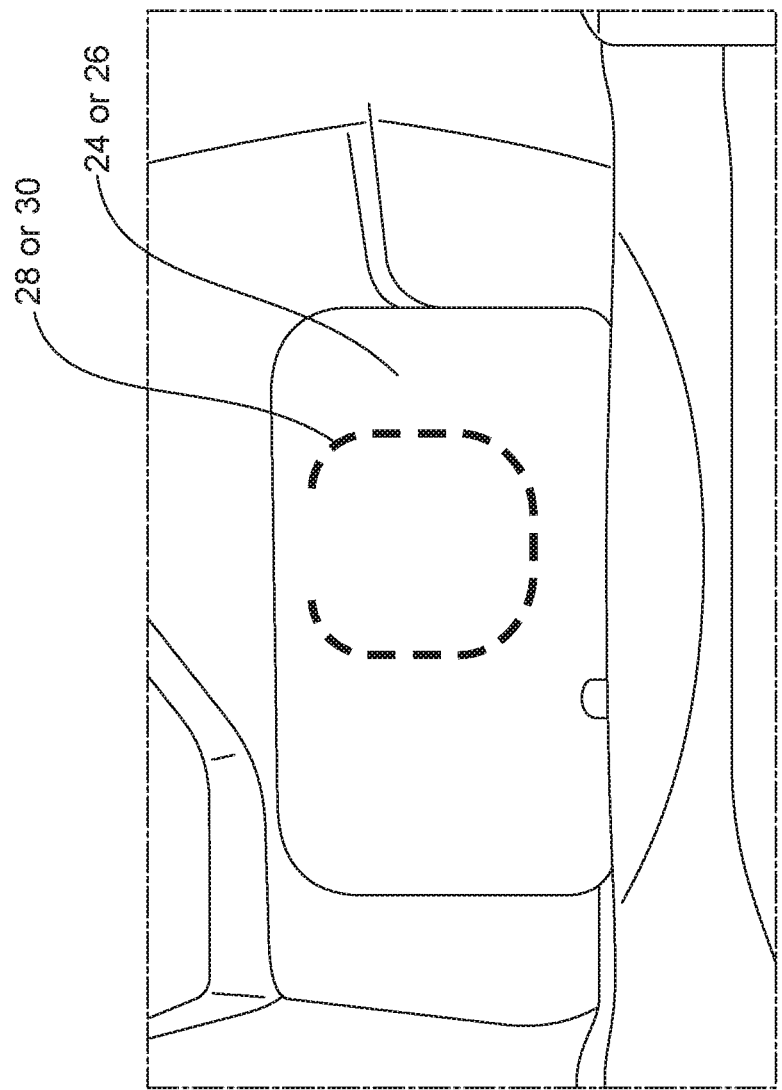

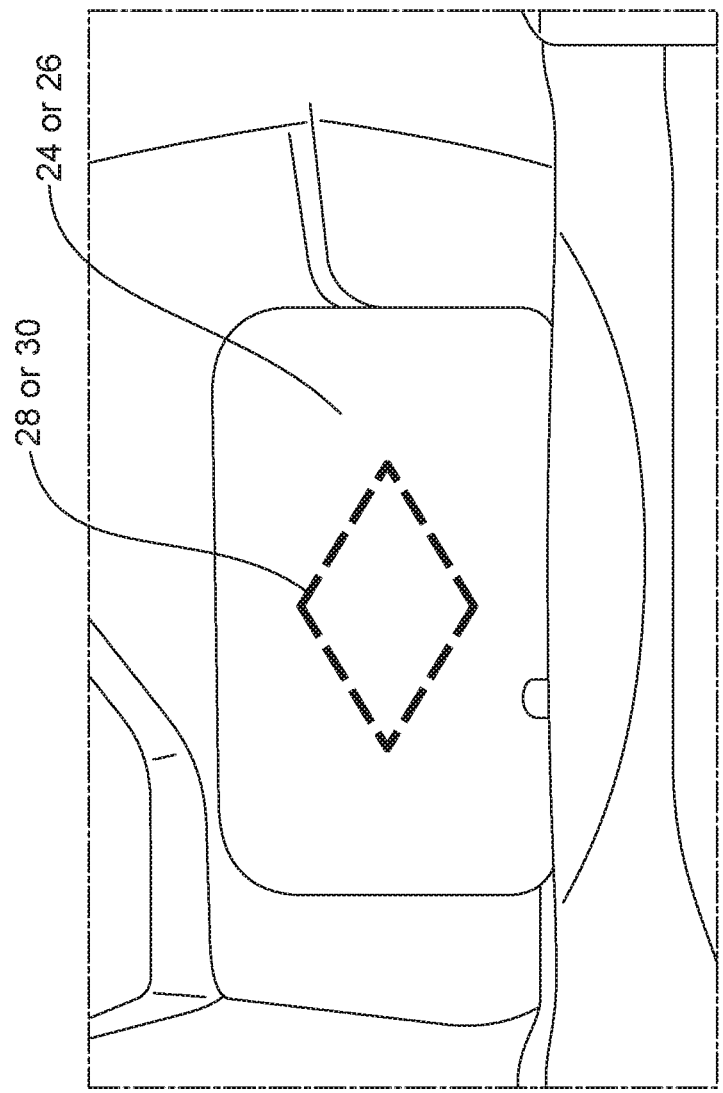

HOOD LIFTER ASSEMBLY WITH PROTECTIVE COVER

TECHNICAL FIELD

This document relates generally to the motor vehicle equipment field and, more particularly, to a hood lifter assembly including a cover for protecting the actuators of the hood lifting assembly from heat and water exposure as well as improving the under hood appearance of the motor vehicle.

BACKGROUND

During a motor vehicle and pedestrian impact event, it is well known that forces exerted on the pedestrian's body via contact with the front bumper and fascia of the motor vehicle tend to cause the pedestrian's head to impinge upon the hood of the motor vehicle. In order to address this issue, hood lifters have been developed to increase the clearance between the hood and the topmost surface of the under hood components and thereby allow for greater hood deflection which in turn provides pedestrian protection during an impact event of the type described. Hood lifters of this type are disclosed in, for example, U.S. Pat. No. 8,490,735 assigned to Ford Global Technologies of Dearborn, Mich.

A hood lifter assembly of the type described is exposed to heat from the motor vehicle engine and exhaust components and water from windshield runoff, road splash and engine compartment cleaning. In some vehicles, it may not be possible to divert water effectively from the hood lifters due to packaging constraints or other reasons. This document relates to a hood lifter assembly incorporating a separate cover to protect the actuators of the hood lifter assembly from water and heat as well as improve the appearance and craftsmanship under hood.

SUMMARY

In accordance with the purposes and benefits described herein, a hood lifter assembly is provided. That hood lifter assembly comprises an actuator including a piston displaceable between a home position and a hood lifting position and a cover that aesthetically conceals the piston in the home position and protects the actuator from water exposure.

The cover may include a tear seam so that the piston may be deployed through the tear seam in the cover when the piston is displaced from the home position to the hood lifting position. That tear seam may have a shape selected from a group of shapes including but not limited to: round, oval, square, rectangular, polygonal, diamond, and hexagonal. When such a tear seam is provided, a portion of the cover comprises a detachable piece when the piston is deployed.

In other embodiments, the tear seam may comprise various shapes including, for example −, +, x, *, H, I, C, shapes. When such a tear seam is provided, the piston is simply deployed through the tear seam in the cover and no portion of the cover is detachable.

In some embodiments the cover may comprise an extension of the leaf screen or cowl vent grille thereby forming an integral part of that component. Thus, in accordance with an additional aspect, a cowl vent grille is provided for a motor vehicle. That cowl vent grille comprises a body including a vent opening and a first hood lifter cover. That first hood lifter cover includes a first tear seam through which a hood lifter piston is deployed in response to a pedestrian impact event. Further, the cowl vent grille may include a second hood lifter cover which may include a second tear seam through which a second hood lifter piston is deployed in response to the pedestrian impact event.

In accordance with still another aspect, a method is provided of lifting a motor vehicle hood in response to a pedestrian impact event. That method may be broadly described as comprising the steps of covering an actuator of a hood lifter assembly with a cover so as to protect that actuator from water exposure and deploying a piston of the actuator through the cover so as to raise the motor vehicle hood in response to a pedestrian impact event.

Further, the method may include the step of providing a tear seam in the cover on a deployment path of the piston. Still further, the method may include the step of forcing the piston through the tear seam and the cover.

Still further the method may include the step of providing the cover as an integral part of a cowl vent grille. Still further, that method may include the steps of: (a) covering a second actuator of the hood lifter assembly with a second cover so as to protect the second actuator from water exposure, (b) deploying a second piston of the second actuator through the second cover so as to raise the motor vehicle hood in response to the pedestrian impact event and (c) providing the second cover as a second integral part of the cowl vent grille.

In the following description, there are shown and described several preferred embodiments of the hood lifter assembly and the cowl vent grille. As it should be realized, the hood lifter assembly and the cowl vent grille are capable of other, different embodiments and their several details are capable of modification in various, obvious aspects all without departing from the hood lifter assembly and cowl vent grille as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the hood lifter assembly and cowl vent grille and together with the description serve to explain certain principles thereof. In the drawing figures:

FIG. 1 is a schematic block diagram of the hood lifter assembly with the pistons thereof in the home position concealed beneath the covers.

FIG. 1a is a schematic block diagram of the hood lifter assembly of FIG. 1 but illustrating the pistons in the hood lifting position.

FIGS. 2a-2i illustrate nine different possible embodiments of a tear seam incorporated into the cover and specifically adapted to allow deployment of a piston of the hood lifter assembly through the cover in order to lift the hood in the event of a pedestrian impact event.

Figure 3:
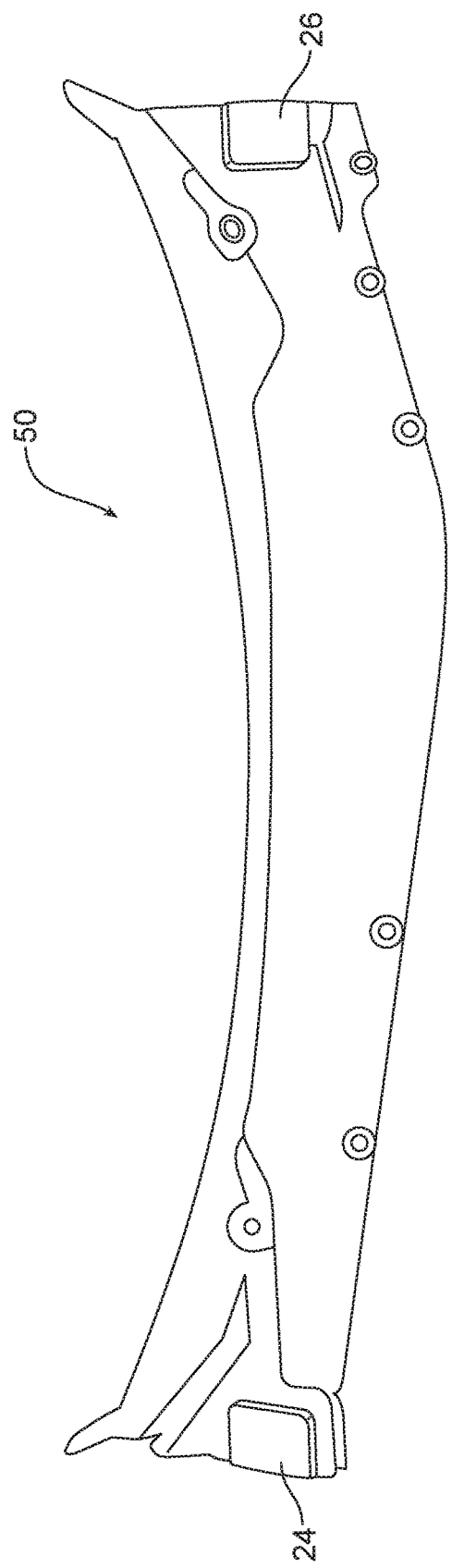
FIG. 3 is a top perspective view of a cowl vent grille incorporating integral covers for the hood lifter assembly.

Reference will now be made in detail to the present preferred embodiments of the hood lifter assembly and cowl vent grille, examples of which are illustrated in the accompanying drawing figures.

DETAILED DESCRIPTION

Reference is now made to FIG. 1 which schematically illustrates a hood lifter assembly 10. In the illustrated embodiment, the hood lifter assembly 10 includes a first actuator 12 and a second actuator 14. The operation of the first actuator 12 and the second actuator 14 is controlled by means of the controller 16. Controller 16 may comprise a computing device, such as a dedicated microprocessor or an electronic control unit (ECU) operating in accordance with instructions from appropriate control software. Such a controller 16 may include one or more processors, one or more memories and one or more network interfaces communicating with each other over a communication bus. In the illustrated embodiment, the controller 16 is connected to one or more sensors 18, of a type known in the art, that are specifically adapted and designed to detect a motor vehicle pedestrian impact event wherein the motor vehicle contacts the pedestrian along the front bumper and/or fascia of the motor vehicle.

When the controller 16 receives data from the sensors 18 indicative of such a pedestrian impact event, the controller 16 sends control signals to the first actuator 12 and the second actuator 14 which cause the first actuator and the second actuator to lift the hood 15 of the motor vehicle away from the under hood components thereby allowing for greater hood deflection which helps protect the pedestrian involved in the impact event.

More specifically, the first actuator 12 includes a first piston 20 while the second actuator 14 includes a second piston 22. The first piston 20 is deployed or displaced from a home position illustrated in FIG. 1 to a deployed, hood lifting position illustrated in FIG. 1a wherein the hood 15 is raised. Similarly, the second piston 22 is displaced from the home position illustrated in FIG. 1 to the deployed or hood lifting position illustrated in 1a.

As schematically illustrated in FIG. 1, the hood lifter assembly 10 also includes a first cover 24 overlying the first actuator 12 and a second cover 26 overlying the second actuator 14. The covers 24, 26 conceal the first and second actuators 12, 14, including the associated pistons 20, 22, thereby providing a more aesthetically pleasing under hood appearance. Further, the covers 24, 26 help shield the actuators 12, 14 from heat produced by the motor vehicle engine and exhaust system. The covers 24, 26 also function to limit or prevent the actuators' 12, 14 exposure to water.

In the illustrated embodiment, the first cover 24 includes a tear seam 28 while the second cover 26 includes a tear seam 30. As best illustrated in FIGS. 2a-2i, the tear seams 28, 30 may assume various configurations which are adapted or designed to accommodate the packaging, shape, and deployment characteristics of the pistons 20, 22 of the hood lifter assembly 10.

More specifically, as illustrated in FIG. 2a, the tear seams 28, 30 may comprise a "+" shape. As illustrated in FIG. 2b, the tear seams 28, 30 may comprise an "I" shape. As illustrated in FIG. 2c, the tear seams 28, 30 may comprise an "H" shape. As illustrated in FIG. 2d, the tear seams 28, 30 may comprise a "*" shape.

As illustrated in FIG. 2e, the tear seams 28, 30 may comprise an "x" shape. As illustrated in FIG. 2f, the tear seams 28, 30 may comprise a "□" shape. As illustrated in FIG. 2g, the tear seams 28, 30 may comprise a "○" shape. As illustrated in FIG. 2h, the tear seams 28, 30 may comprise a "C" shape. As illustrated in FIG. 2i, the tear seams 28, 30 may comprise a "◇" shape.

Any or all of the tear seams 28, 30 disclosed in FIGS. 2a-2i may be made by one or more score lines in the cover 24, 26 which extends through the majority of the thickness of the cover thereby creating a frangible line of reduced strength. Where the tear seams 28, 30 form an enclosed area such as illustrated in FIGS. 2f and 2g, that area of the cover 24, 26 within the tear seam may comprise a detachable piece that detaches from the remainder of the cover when the piston 20, 22 is deployed. When the tear seams 28, 30 take the shape illustrated in FIG. 2h, the area of the cover 24, 26 within the shape forms a flap when the piston 20, 22 is deployed. In other embodiments, such as illustrated in FIGS. 2a-2e, the pistons 20, 22 are simply deployed through the tear seams 28, 30 and the covers 24, 26 simply fold out of the way.

Here it should be appreciated that the tear seams 28, 30 illustrated in FIGS. 2a-2i are merely exemplary of the multitude of possible configurations that may be provided. Those configurations include various closed shapes such as round, oval, square, rectangular, diamond, hexagonal, polygonal or the like which form a detachable piece or other various opening shapes such as −, +, x, *, H, I, C, or the like which merely tear and provide a pathway for the deployment of the pistons 20, 22 through the covers 24, 26 into the hood 15 so that the hood is lifted away from the under hood components of the motor vehicle to allow for greater deflection. Advantageously, the greater deflection provided by the lifting of the hood helps protect the pedestrian in the event of a pedestrian impact event with the front bumper or fascia of the motor vehicle.

Figure 4B:
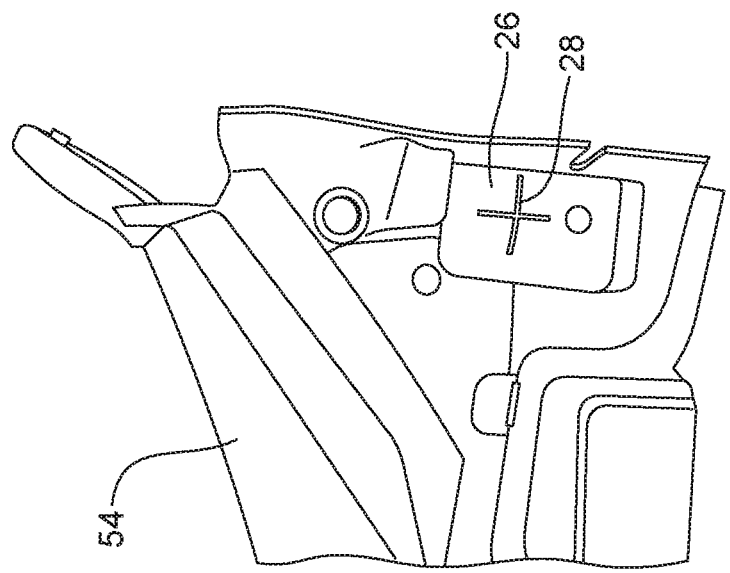
FIGS. 4a and 4b are respective detailed top plan and bottom plan views of one of the integral covers on the cowl vent grille.
Figure 4A:
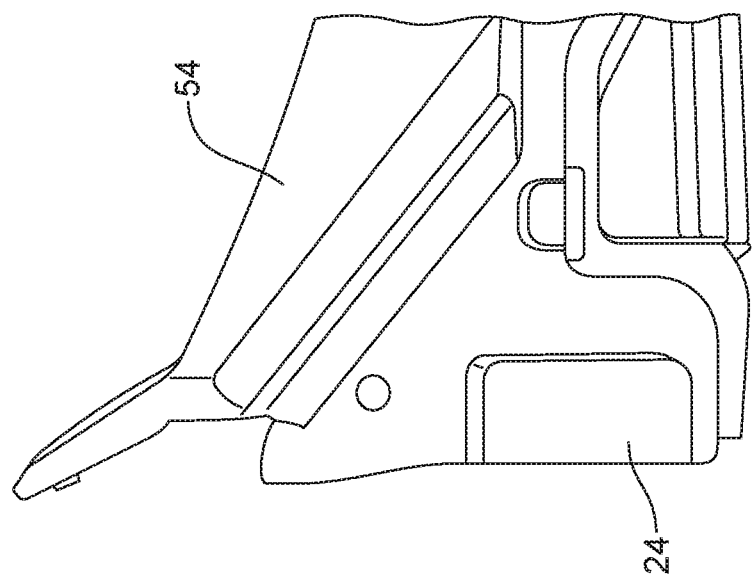
Figure 5:
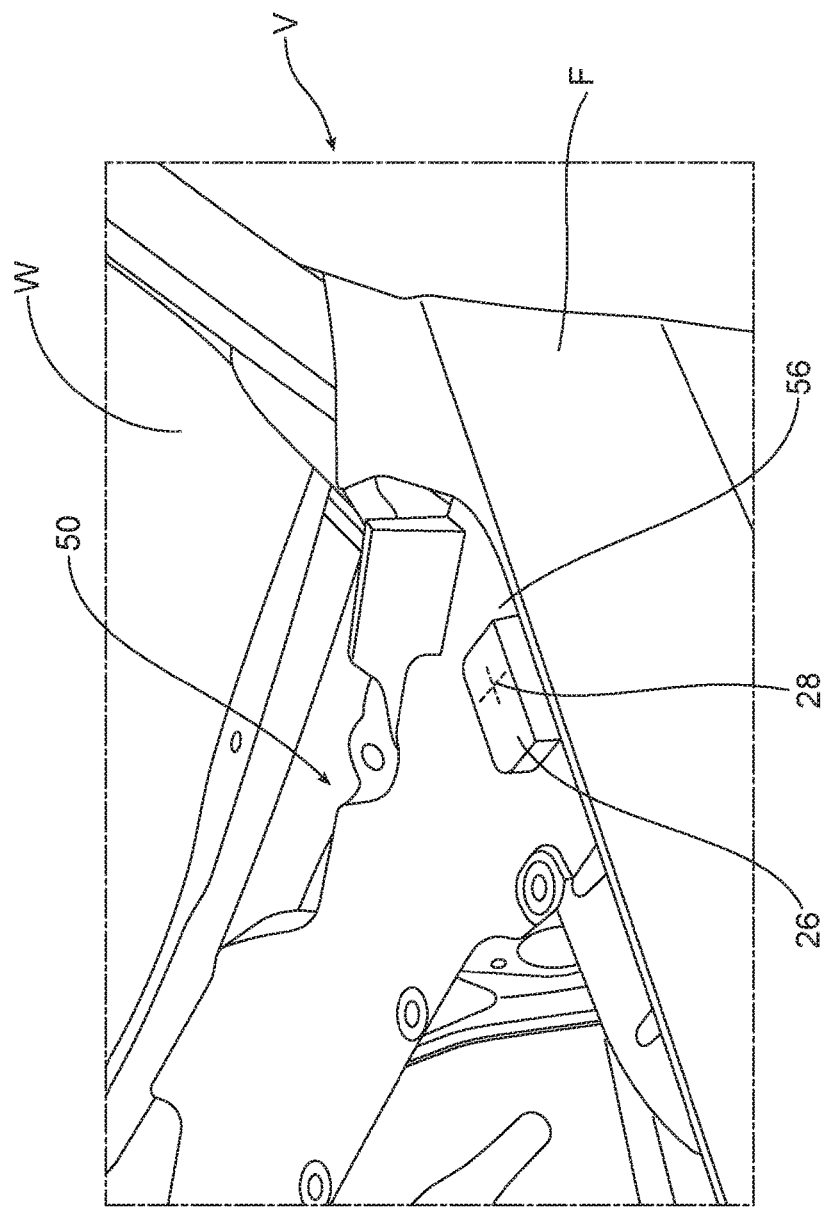
FIG. 5 is a perspective view illustrating the positioning of the cowl vent grille on a motor vehicle. The hood is open to expose the cowl vent grille to view.

As best illustrated in FIG. 3, the covers 24, 26 may be provided as an integral part of a leaf screen or cowl vent grille 50. As illustrated in FIGS. 3, 4a and 4b, the cowl vent grille 50 includes a first side extension 54 integrally incorporating the first cover 24 and a second side extension 56 integrally incorporating the second cover 26. FIGS. 4a and 4b are respective detailed top plan and bottom plan views of the first extension 54 and the first cover 24. As illustrated, the tear seam 28 in the first cover 24 of the illustrated embodiment has a "+" shape formed by score lines provided only in the bottom face of the cover. FIG. 5 illustrates the cowl vent grille 50 in position on the motor vehicle V at the base of the windshield W. In FIG. 5, the hood has been removed in order to illustrate the position of the cowl vent grille 50 with the cover 26 adjacent the fender F. By incorporating the covers 24, 26 into the cowl vent grille 50, common parts may be provided for vehicles with and without deployable hoods at an overall reduced cost.

As should be appreciated from the above description, the covers 24, 26 function to protect the first actuator 12 and second actuator 14 from heat and water exposure while also providing an improved aesthetic under hood appearance. The tear seams 28, 30 in the covers 24, 26 allow the pistons 20, 22 of the hood lifter assembly 10 to be easily deployed through the covers 24, 26 without negatively impacting the performance of those actuators to lift the hood 15 in response to a pedestrian impact event.

Consistent with the above description, a method is provided of lifting a motor vehicle hood 15 in response to a pedestrian impact event. That method may be broadly described as comprising the steps of covering an actuator 12 or 14 with a cover 24 or 26 so as to protect the actuator from water exposure and deploying a piston 20 or 22 of the actuator through the cover so as to raise the motor vehicle hood 15 in response to the pedestrian impact event.

More specifically, the method includes the step of providing a tear seam 28 or 30 in the cover 24 or 26 on a deployment path of the piston 20 or 22. Further, the method includes forcing the piston 20 or 22 through the tear seam 28 or 30 in the cover 24 or 26 during deployment as the piston is displaced from the home position illustrated in FIG. 1 to the raised position illustrated in FIG. 1a. Still further, the method may include providing the covers 24, 26 as an integral part of the cowl vent grille 50.

The foregoing has been presented for purposes of illustration and description. It is not intended to be exhaustive or to limit the embodiments to the precise form disclosed. Obvious modifications and variations are possible in light of the above teachings. For example, the covers 24, 26 may comprise substantially any under hood trim component including, but not necessarily limited to dedicated covers, leaf screens, cowl screens, beauty shields and shared covers with other components. While two actuators 12, 14 and two covers 24, 26 are illustrated in the drawing's figures fewer or more may be provided. They may also be provided at other locations than that illustrated in the drawing figures. All such modifications and variations are within the scope of the appended claims when interpreted in accordance with the breadth to which they are fairly, legally and equitably entitled.

What is claimed:

1. A hood lifter assembly, comprising:
   an actuator including a piston displaceable between a home position and a hood lifting position; and
   a cover overlying said piston in said home position and protecting said actuator from water exposure, wherein said cover includes a tear seam and said piston is deployed through said tear seam in said cover when said piston is displaced from said home position to said hood lifting position.

2. The hood lifter assembly of claim 1, wherein said tear seam has a shape selected from a group of shapes consisting of round, oval, square, rectangular, polygonal, diamond and hexagonal.

3. The hood lifter assembly of claim 1, wherein said tear seam has a "+" shape.

4. The hood lifter assembly of claim 1, wherein said tear seam has a "–" shape.

5. The hood lifter assembly of claim 1, wherein said tear seam has an "X" shape.

6. The hood lifter assembly of claim 1, wherein said tear seam has a "*" shape.

7. The hood lifter assembly of claim 1, wherein said tear seam has a "H" shape.

8. The hood lifter assembly of claim 1, wherein said tear seam has an "I" shape.

9. The hood lifter assembly of claim 1, wherein said tear seam has a "C" shape.

10. The hood lifter assembly of claim 1, wherein said cover comprises a cowl vent grille.

11. A cowl vent grille for a motor vehicle, comprising:
    a body including a vent opening and a first hood lifter cover.

12. The cowl vent grille of claim 11, wherein said first hood lifter cover includes a first tear seam through which a hood lifter piston is deployed in response to a pedestrian impact event.

13. The cowl vent grille of claim 12, further including a second hood lifter cover.

14. The cowl vent grille of claim 13, wherein said second hood lifter cover includes a second tear seam through which a second hood lifter piston is deployed in response to said pedestrian impact event.

15. A method of lifting a motor vehicle hood in response to a pedestrian impact event, comprising:
    covering an actuator of a hood lifter assembly with a cover so as to protect said actuator from water exposure; and
    deploying a piston of said actuator through said cover so as to raise said motor vehicle hood in response to said pedestrian impact event.

16. The method of claim 15, further including providing a tear seam in said cover on a deployment path of said piston.

17. The method of claim 16, further including forcing said piston through said tear seam in said cover.

18. The method of claim 17, further including providing said cover as an integral part of a cowl vent grille.

19. The method of claim 18, further including:
    covering a second actuator of said hood lifter assembly with a second cover so as to protect said second actuator from water exposure;
    deploying a second piston of said second actuator through said second cover so as to raise said motor vehicle hood in response to said pedestrian impact event; and
    providing said second cover as a second integral part of said cowl vent grille.

\* \* \* \* \*